United States Patent [19]

Sosulnikov et al.

[11] 4,063,568
[45] Dec. 20, 1977

[54] VALVE

[76] Inventors: Gleb Borisovich Sosulnikov, Zverinetskaya ulitsa, 14, kv. 14; Vladimir Mikhailovich Fomichev, Tashkentskaya ulitsa, 18, korpus 2, kv. 145; Ljudmila Alexandrovna Tsiporina, Strelbisdensky pereulok, 25a, kv. 32; Mikhail Prokhorovich Selivanov, Leningradskoe shosse 49-51, kv. 38, korpus 1; Lev Vladimirovich Bobrakov, Christoprudny bulvar, 14, kv. 56; Alexandr Sergeevich Axenov, Ivovaya ulitsa 7, kv. 32; Dmitry Vladimirovich Alexandrov, Profsojuznaya ulitsa, 46, korpus 5, kv. 33, all of Moscow, U.S.S.R.; Maxim Semenovich Ugrjumov, deceased, late of Moscow, U.S.S.R.; by Raida Nikolaevna Ugrjumova, administratrix, ulitsa Demyana Bednogo, 1, korpus 2, kv. 52, Moscow, U.S.S.R.; by Nikolai Maximovich Ugrjumov, administrator, ulitsa Demyana Bednogo, 1, korpus 2, kv. 52, Moscow, U.S.S.R.; by Lidia Maximovna Tjumina, administratrix, ulitsa Demyana Bednogo, 1, korpus 2, kv. 52, Moscow, U.S.S.R.

[21] Appl. No.: 725,293

[22] Filed: Sept. 21, 1976

Related U.S. Application Data

[63] Continuation of Ser. No. 639,623, Dec. 10, 1975, abandoned.

[51] Int. Cl.² .............................................. F16K 11/04
[52] U.S. Cl. ..................................... 137/270; 137/271; 137/596; 137/625.27
[58] Field of Search ............ 137/269, 270, 271, 270.5, 137/596, 596.1, 596.2, 596.17, 596.18, 625.27

[56] References Cited

U.S. PATENT DOCUMENTS

| 2,404,514 | 7/1946 | McClure | 137/596.17 |
| 3,009,481 | 11/1961 | Randol | 137/596.1 |
| 3,123,091 | 3/1964 | Elsey | 137/270 |
| 3,196,896 | 7/1965 | Leulenegger | 137/271 |
| 3,366,424 | 1/1968 | Edwards | 137/596.18 X |
| 3,454,045 | 7/1969 | Kaemmer | 137/596.18 |
| 3,878,859 | 4/1975 | Grop et al. | 137/270 |

Primary Examiner—Alan Cohan
Attorney, Agent, or Firm—Holman & Stern

[57] ABSTRACT

Installed co-axially in the valve body, along its axis, are two identical sockets with central holes in their bottoms, the holes forming seats closed by closing elements. The sockets are provided with annular seals which divide the valve body into three chambers, viz., an inlet chamber which receives the fluid under pressure, an outlet chamber communicating with the output element and a return chamber for draining the fluid from the output element back into the system. The sockets can be installed with their bottoms directed either towards each other to form a "normally-open" valve or away from each other to form a "normally-closed" valve. The closing elements are accommodated in cages and operated by a drive such as an electromagnetic drive. The critical limits of valve operation are set by springs.

7 Claims, 4 Drawing Figures

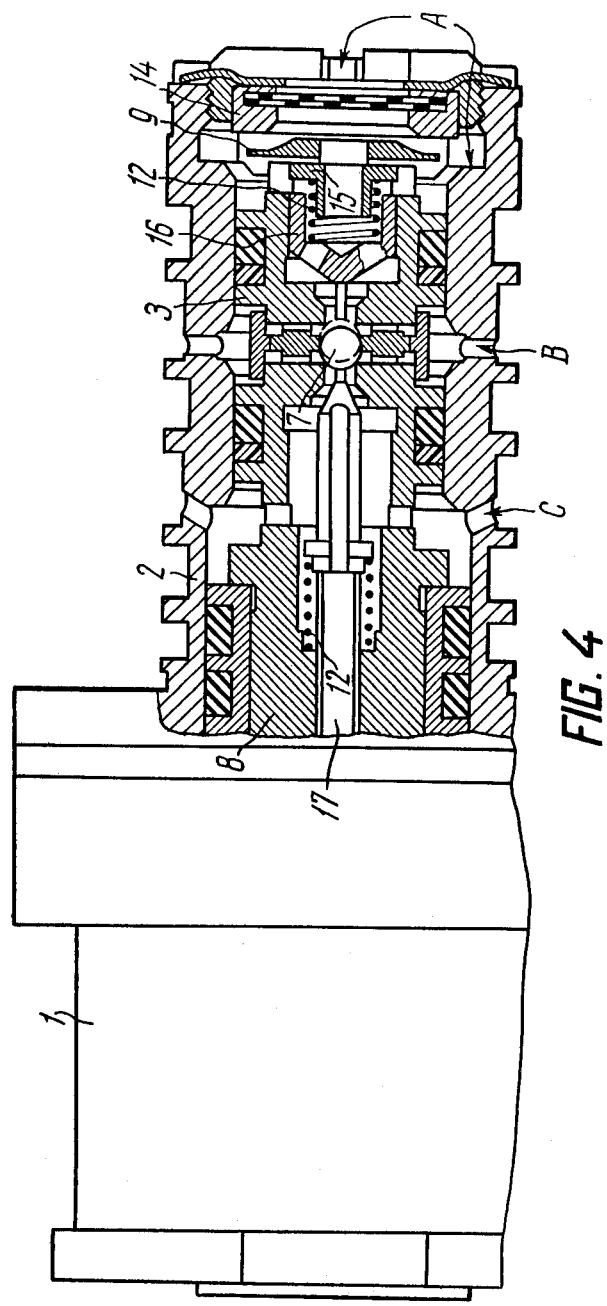

VALVE

This is a continuation of application Ser. No. 639,623 filed Dec. 10, 1975 now abondoned.

BACKGROUND OF THE INVENTION

The present invention relates to valves used, for example, in aircraft control systems and can find application in any hydraulic system which transforms an output element displacement into a fluid flow driving a hydraulic actuator.

Nowadays, with the advent of supersonic airliners, an urgent problem lies in standardization as a means for improving reliability, extending the service life and attaining pressure-tightness at low inlet pressures of the elements used in aircraft control systems.

The prototype of the proposed invention is the valve incorporated in "Electrohydraulic two-stage digital-control drive" covered by inventor's Certificate No.217,844, USSR.

Considerable disadvantages of such an electrohydraulic valve as well as of the valves utilized in control mechanisms of the type "Hydraulic servocylinder", Series 7, manufactured by Minneapolis Honeywell Regulator Co. (USA) lie in that they are single-functional within the limits of one design, i.e., it is impossible to make a "normally-closed" or a "normally-open" valve without modifying the design of the electromagnet and hydraulic parts of the valve; in low reliability, insufficient service life span, impossibility of ensuring pressure-tightness at low inlet pressures in the "Electrohydraulic two-stage digital-control drive" because of absence of fixed contact between the moving elements of the electrohydraulic valve which increases considerably the impact loads on the stationary parts so that they work under the conditions of an anvil whereas in the above-mentioned valve of American production these disadvantages are caused by the provision of a moving seal.

SUMMARY OF THE INVENTION

An object of the present invention is to provide a valve with a ball-type closing element which has a wide field of application.

A further object of the present invention is to provide a valve with a ball-type closing element which operates in a "normally-closed" position.

A further object of the present invention is to provide a valve with a ball-type closing element which operates in a "normally-open" position.

A further object of the present invention is to provide a valve with a ball-type closing element which ensures liability combined with a longer service life.

A further object of the present invention is to provide a valve with a ball-type closing element which guarantees pressuretightness at a minimum inlet pressure.

A further object of the present invention is to provide a valve with a ball-type closing element which operates in a "normally-open" position at a minimum inlet pressure.

These and other objects are accomplished by providing a valve with a closing element comprising a body with two seats for ball-type closing elements arranged along the axis of the body, the closing elements being operated by a drive via a pushrod to direct the flow of a fluid from a source of pressure to an output element and from the output element back into the system through channels in the body. The valve is characterized in that, installed coaxially in the valve body, along its axis, are two identical sockets with central holes in their bottoms, the edges of the holes forming seats for the ball-type closing elements, the sleeves being adapted for installation with their bottoms directed either towards or away from each other and have annular seals which divide the inner space of the valve body into three chambers regardless of the position of the sockets, i.e., an inlet chamber "A" for receiving the fluid under pressure, an outlet chamber "B" communicating with the output element and a return chamber "C" for draining the fluid from the output element back into the system.

Such a layout makes it possible to provide a valve with a ball-type closing element which has a standardized design and can be quickly and easily reset for either "normally-open" or "normally-closed" operation.

In one of the embodiments of the present invention, the valve with a closing element working in a "normally-closed" position has sockets whose bottoms are directed away from each other and their seats cooperate with the closing elements located outside in aligning separator cages, the closing element nearest to the valve inlet being acted upon by the flow of the fluid under pressure directed onto the seat whereas the other closing element bears against the drive rod and interacts with a pushrod which transmits the axial motion of the drive rod to the closing element nearest to the valve inlet.

Such a layout facilitates operation of the valve with a ball-type closing element in a "normally-closed" position.

According to another embodiment of the present invention, the valve with a closing element is characterized in that in the "normally-open" position of the valve the bottoms of the sockets are directed towards each other, the closing element is installed between the seats in the separator cage and is in operational contact with the drive rod.

Such a layout, in turn, ensures operation of the valve with a closing element in a "normally-open" position.

In accordance with a further embodiment of the invention, the valve with a closing element is characterized in that the drive rod incorporates a spring which presses the rod towards the closing element in the direction of the seat, thus guaranteeing reliable contact between the rod and the closing element.

This arrangement ensures reliable contact between the drive rod and the closing element avoiding splitting of the drive rod end which improves considerably its service life and reliability.

According to another modification of the present invention, the valve with a closing element is characterized in that the closing element which is nearest to the valve inlet contacts a spring element which presses the closing element against the seat and the pushrod.

Such an arrangement ensures pressuretightness of the valve with a closing element during "normally-closed" operation at minimum inlet pressures.

According to another embodiment of the present invention, the valve with a closing element is characterized in that its socket accommodates a flexible element installed at the side of the fluid delivery channel and pressing the closing element in the direction of the valve opening for communicating the inlet and outlet chambers.

Such a layout ensures "normally-open" operation of the valve at minimum inlet pressures.

BRIEF DESCRIPTION OF THE DRAWINGS

Other features and advantages of the present invention will become apparent from the detailed description that follows and from the accompanying drawings, in which:

FIG. 4 shows the fourth version of a "normally-open" valve.

DETAILED DESCRIPTION OF THE PREFERRED EMBODIMENT

Figure 1:
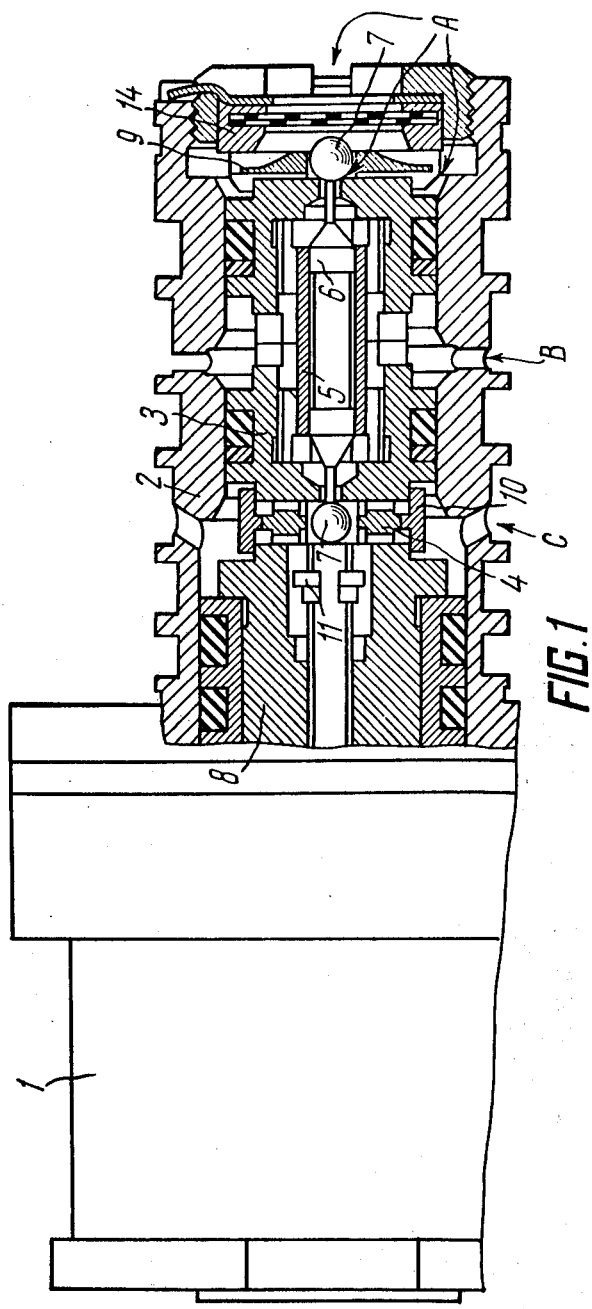
FIG. 1 shows the first version of the valve in a "normally-closed" position.

The valve consists essentially of two portions, i.e., an electromagnetic portion and hydraulic portion. The electromagnetic portion of the valve is made in the form of a standardized electromagnet 1.

The hydraulic portion of the valve is assembled in a sleeve-body 2.

The sleeve-body 2 is designed in such a way that the distances between the holes of the hydraulic lines: delivery "A" and control "B" and of the hydraulic lines: control "B" and return "C" are equal, respectively, to the length of a socket 3 and the sum of the lengths of a socket 3 and a cage 4 taken together with a closing element 7.

FIG. 1 shows the first version of the valve in a "normally-closed" position with the sleeve-body 2 accommodating two identical sockets 3 whose inside diameters align a bushing 5 while the inside diameter of the bushing 5 guides a pushrod 6 whose ends move two closing elements 7 one of which is contained inside a cage 4 resting on a stop 8 and one of the sockets 3 whereas the other one is contained in a limiter 9 resting on the other socket 3. The outside diameter of the cage 4 is aligned in a guide 10 whose shoulders guide the stop 8 and the socket 3.

Figure 2:
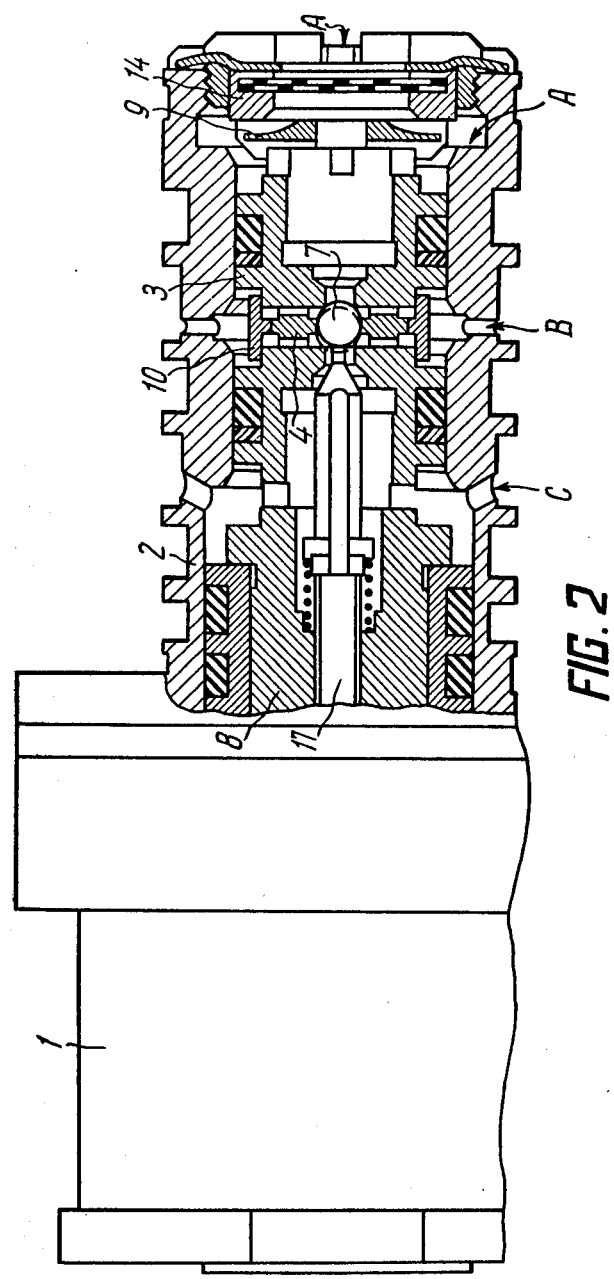
FIG. 2 shows the second version of the valve in a "normally-open" position.

In FIG. 2 the second version of the valve in a "normally-open" position is made by turning the sockets 3 through 180° and installing the cage 4 with the closing element 7 between them.

The inside diameter of the guide 10 aligns the cage 4 while its shoulders align the recesses in the sockets 3. The face surface of the stop 8 guides the face surface of one of the sockets 3, whereas the pushrod 6, the bushing 5, one closing element 7 and rod 11 are not used during assembly.

Figure 3:
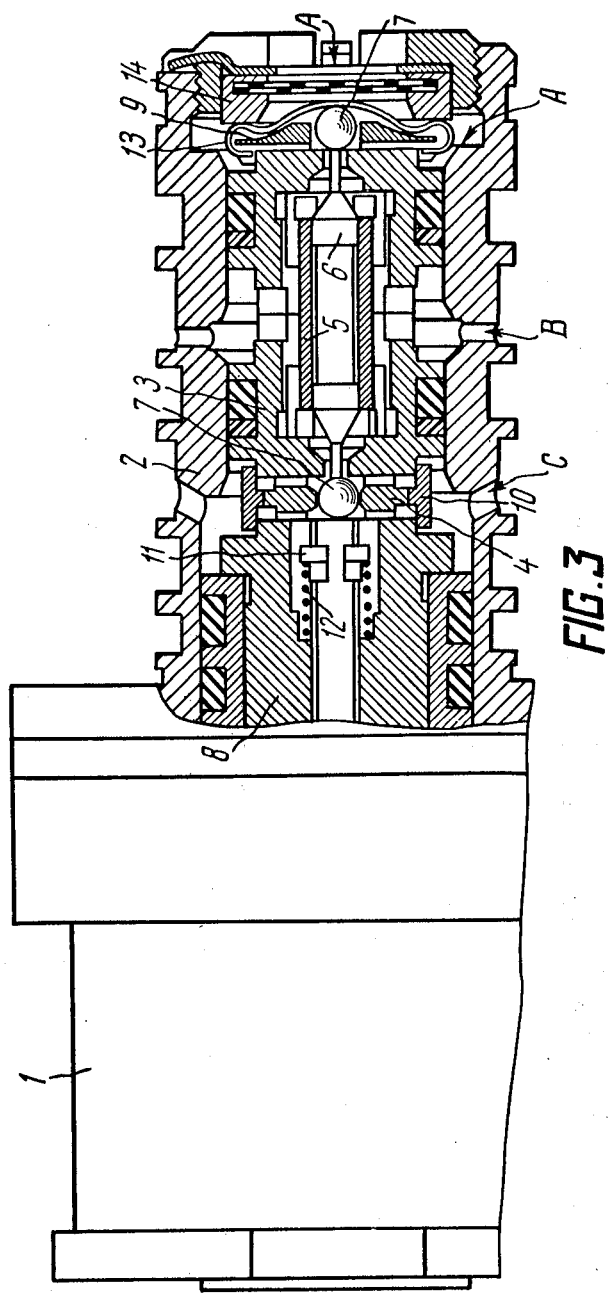
FIG. 3 shows the third version of the valve in a "normally-closed" position.

FIG. 3 shows the third version of the valve in a "normally-closed" position which is a modification of the first version (FIG. 1) of the valve with an introduced cylindrical spring 12 accommodated in a recess of the stop 8 and resting at the other end against the shoulder of the rod 11, and a flat spring 13 located in recess of the limiter 9 and articulated to the washer of the filter 14. The springs 12 and 13 constantly press the rod 11 and the pushrod 6 against the closing elements 7 ensuring their impact-free operation in turning the valve on and off which increases the life of the valve, improves its reliability and pressuretightness at a minimum pressure in the hydraulic delivery line "A", the valve dimensions being unchanged.

For the accomplishment of the same objects in the fourth version of the valve in a "normally-open" position, FIG. 4, the valve comprises a cylindrical spring 12; at the side of the stop 8 the spring 12 is aligned similarly to the third version; also it is aligned in a supporting bushing 15 pressed by the washer of the filter 14 via the limiter 9 from the side of the hydraulic delivery line "A" and rests at the other end on the inner recess of an end-piece 16. In this version of the valve, like in the third version (FIG. 3), the springs 12 press the rod 17 and the end-piece 16 against the closing element 7.

The above-described valve functions as follows. As the electromagnet 1 is energized in the first version (FIG. 1) of the valve in the "normally-closed" position the rod 11 moves the closing element 7 contained inside the cage 4 thus shutting off the hydraulic return line "C" whereas the pushrod 6 moves the other closing element 7 thus opening the valve and admitting the fluid from the hydraulic delivery line "A" into the hydraulic control line "B".

The valve shown in FIG. 3 (third version) operates similarly to the one shown in FIG. 1 (first version) but the difference of forces of the cylindrical spring 12 and the flat spring 13 is selected so as to ensure pressuretightness of the valve at a minimum pressure in the hydraulic delivery line "A".

As the electromagnet 1 is energized in the second version of the valve in the "normally-open" position (FIG.2), the rod 17 moves the closing element 7, opening the hydraulic return line "C" and shutting off the supply of the fluid from the hydraulic delivery line "A" into the hydraulic control line "B".

The valve shown in FIG. 4 (fourth version) functions similarly to the one shown in FIG. 2 (second version) but in the fourth version of the valve in the "normally-open" position the difference between the precompression forces of the springs 12 is selected so as to ensure pressuretightness of the valve at a minimum pressure in the hydraulic delivery line "A".

Thus, the valve according to the invention has an advantage over the previously known valves consisting in that one standardized design of the valve can be used for assembling the valves with a different function. Also, another important advantage of this valve is its versatility and multifunctional operation in hydraulic control lines.

The last advantage becomes particularly important when the valve is used in compact vital units, e.g. in aircraft. Enumerated briefly below are various modes of valve operation under different conditions of its employment:

1. control of the movement of an output actuating mechanism, ensuring the required speed of displacement;

2. control of intermediate elements in servosystems;

3. supply of the fluid into the spaces of actuating mechanisms in hydraulic systems;

4. operation in hydraulic systems for locking the actuating element in any intermediate position;

5. joint operation of a pair of valves of different types to ensure the required law of motion of the actuating mechanism;

6. operation in hydraulic systems in the regime of a nonreturn valve.

We claim:

1. A ball-type valve intended for installation in hydraulic systems and comprising: a body with an essentially cylindrical inner space; two identical sockets installed coaxially in the body and provided with central holes in their bottoms the circular edges of the holes forming valve seats; ball closing elements co-operating with the seats with a possibility of valving them; annular seals mounted on the sockets and dividing the valve body into three chambers consisting of an inlet chamber for receiving a fluid under pressure, an outlet chamber communicating with the output element, and a return chamber for draining the fluid from the output element; a drive with a rod adapted to actuate the closing elements to open or close the valve; a pushrod installed along the axis of the valve body and intended to transmit motion from the rod to the closing elements; guides for the pushrod, made in the sockets.

2. The valve acccording to claim 1 wherein at the "normally-closed" duty the bottoms of the sockets are directed away from each other and the seats of the bottoms co-operate with the closing elements installed outside in aligning separator cages, the closing element nearest to the valve inlet being acted upon by the fluid under pressure directed onto the seat while the other closing element bears against the drive rod and interacts with a pushrod which transmits the axial motion of the drive rod to the closing element nearest to the valve inlet.

3. The valve according to claim 1 wherein the bottoms of its sockets in the "normally-open" position face each other and there is a closing ball installed between the seats in the separator cage in operational contact with the drive rod.

4. The valve according to claim 1 wherein the drive rod mounts a spring which presses the rod towards the closing ball in the direction of the seat thus guaranteeing reliable rod-to-closing ball contact.

5. The valve according to claim 2 wherein the closing ball nearest to the valve inlet is in contact with a spring element which presses the closing ball against the seat and the pushrod.

6. The valve according to claim 4 wherein the socket accommodates a flexible element installed at the side of the fluid delivery channel and pressing the closing ball in the direction of the valve opening for communicating the inlet and outlet chambers.

7. The valve according to claim 2 wherein the separator cage is installed in a clamp between the socket and the adjacent thrust element with a provision for prompt replacement, each separator cage permitting only limited axial displacements of the closing ball it accommodates.

* * * * *